Dec. 6, 1938.  C. A. SCHEELER  2,139,423
FRAMED SCREEN
Filed Sept. 19, 1936
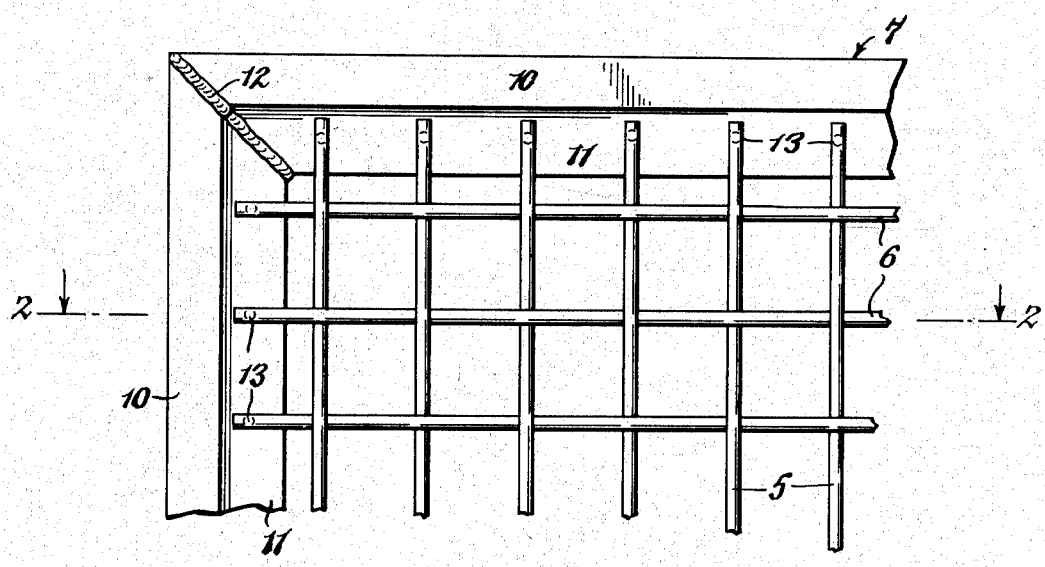
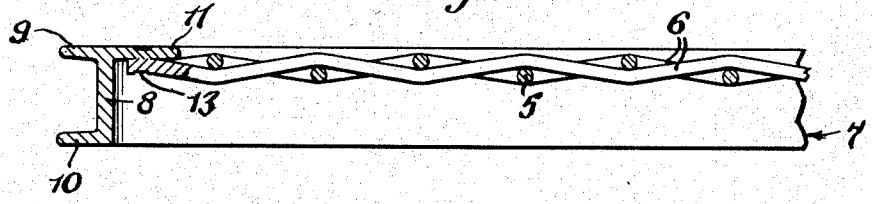
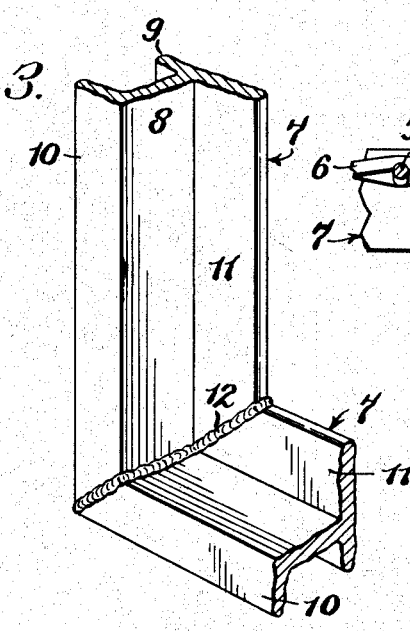 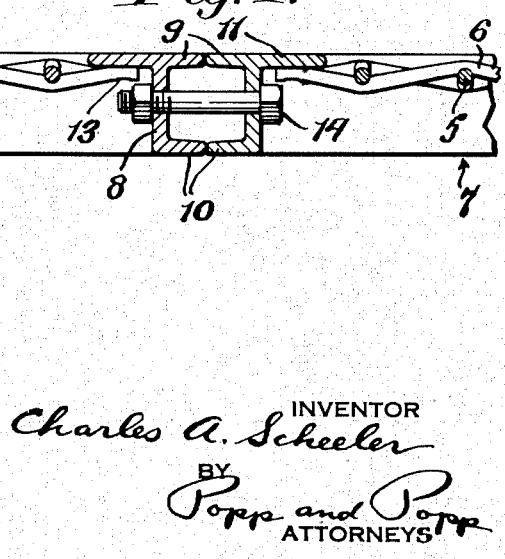
INVENTOR
Charles A. Scheeler
BY
Popp and Popp
ATTORNEYS

UNITED STATES PATENT OFFICE 2,139,423

FRAMED SCREEN

Charles A. Scheeler, Buffalo, N. Y., assignor to Buffalo Wire Works Co., Inc., Buffalo, N. Y., a corporation of New York Application September 19, 1936, Serial No. 101,627

4 Claims. (Cl. 189—79)

This invention relates to a framed screen and more particularly to screen guards such as are used for protecting windows or for building up partitions to fence off and protect stock rooms and the like although, of course, such framed screens have many other uses, such as in outdoor electric signs for supporting the illuminated letters.

The principal object of this invention is to provide such a framed screen which is exceptionally strong and durable and will stand up under conditions of extremely severe use for a long time without becoming sleazy or warped.

Another object of the invention is to provide such a screen which lends itself to mass production and which can be made at a very low cost and in a very short time, thereby reducing the cost of such framed screens.

Another object is to provide such a framed screen which is particularly adaptable for use as partitions, the several sections constituting the partition being readily and securely bolted together so as to form a strong screened wall which does not present any unsightly protuberances.

In the accompanying drawing:

Fig. 1 is a side elevation of a corner of a screened frame made in accordance with my invention.

Fig. 2 is a horizontal section, taken on line 2—2, Fig. 1.

Fig. 3 is a perspective view of a corner of the frame before the screen cloth has been welded thereto.

Fig. 4 is a view similar to Fig. 2 showing the manner in which two frame sections can be bolted together to provide a screen partition for a storeroom or the like.

With screen guards as heretofore constructed the frames were commonly made of heavy wire or round bars bent into rectangular form and the cloth was applied to these frames by bending the edges of the cloth around the frame bars. With such a construction not only was the frame far from rigid but the cloth could not be rigidly secured to this frame and frequently presented projections which were liable to catch clothing or cause injury. In an improved form of such screen guards the frame was built up of outwardly facing channels joined at their ends by providing slots in two of the channels into which tongues of the other two channels were inserted and peened over. Before fabrication the web of each channel was provided with a longitudinal line of holes spaced in accordance with the mesh of the screen and the end of each wire of the screen cloth was inserted into one of these holes and bent over. Not only were these improved screens not unusually rigid at the corners of the frames, but the application of the cloth was extremely slow and laborious. Furthermore, the cloth extended across the center of the frame so that bolts for joining the sections together were not practicable.

In general the present invention comprises a piece of screen cloth made of warp wires 5 interwoven with weft wires 6 and welded to a frame composed of four frame bars 7. Each of the frame bars 7 is made of metal and is composed of a central web 8, flanges 9 and 10 which project outwardly from the edges of the web 8 and a third flange 11 which projects inwardly from the web 8 directly opposite to the flange 9. It will therefore be seen that each bar 7 is a combined channel bar and angle bar, the web 8 being, in effect, the web of the outwardly facing channel formed by the elements 8, 9 and 10 and one leg of the inwardly facing angle formed by the elements 8 and 11.

The angle bars 7 are mitered at their ends and are welded together, as indicated at 12, along the mitered joint. In the completed screen frame the channels formed by the flanges and webs 8, 9 and 10 face outwardly and the flanges 11 extend inwardly and are arranged in the same plane.

After the frame has been completed, as above described, the screen cloth, cut to the proper size, is fitted into the frame so that the ends of the warp and weft wires 5 and 6 rest on the inner faces of the flanges 11. The end of each wire is thereupon spot welded to the inner face of the corresponding flange 11, as indicated at 13. It will therefore be seen that the completed guard is extremely strong because the frame is, in effect, composed of both a metal channel and a metal angle, both structural forms having exceptional rigidity. Furthermore, since the ends of the frame bars are mitered and welded together the frame is exceptionally rigid at its corners, particularly in view of its cross sectional shape which provides an adequate welding surface both diagonally of the screen bars and also transversely thereof. Also since each screen wire is individually spot welded at its opposite ends to the frame the cloth is securely united to the frame and cannot be loosened under any usual conditions.

Since the flanges 11 are located at one extreme side of the screen frame and the cloth is welded to the inside of these flanges it will be seen that the frames can be readily stacked with the cloth of the frames in spaced relation so as to avoid possible injury. Furthermore it will be seen that the greater part of the webs 8 are exposed so that bolts, such as the bolt 14, can be readily passed through these webs in uniting several frames to form a partition. Thus, in Fig. 4, two screen sections are joined together with their flanges 9 and 10 in edge to edge relation and the webs 8 connected by the bolt 14. Screen sections so joined together provide a rigid partition, the bars of which are of smooth external form so as to be readily kept free of dirt and the partition presents no unsightly protuberances, the only exposed parts, other than the regular flat faces of the bars, being the heads and nuts of the bolts 14.

From the foregoing it will be apparent that the present invention provides a screen frame which is exceptionally strong and rigid in construction both because of the particular cross sectional shape of the bars and also because of the mitered and welded joints connecting the ends of the bars. Further, the screen cloth is firmly and rigidly united to the frame by the extremely simple spot welding process so that the frame and cloth cannot become sleazy or warped. Also it will be observed that the screen sections peculiarly lend themselves to the construction of neat and rigid partitions by the simple expedient of belting them together as illustrated in Fig. 4.

I claim as my invention:—

1. An article of the character described, comprising a plurality of metal angle bars joined at their ends to provide a frame, one set of the legs of said angle bars being joined end to end and being disposed in the same plane and the other set extending laterally in the same direction from said first set and a piece of relatively heavy gage wire cloth the strands of which are arranged in a common plane and set into said frame and having their ends welded at one side to the inner faces of said first set of legs.

2. An article of the character described, comprising a plurality of metal bars joined at their ends to provide a frame, each of said bars being h-shaped in cross section and having a central web disposed at right angles to the general plane of the frame, a flange projecting inwardly from one edge of said web and forming, in effect, an inwardly facing angle bar and a pair of flanges projecting outwardly from the edges of said web in the opposite direction from said first flange and forming, in effect, an outwardly facing channel, and a piece of relatively heavy gage wire cloth the strands of which are arranged in a common plane and secured at their ends to said frame.

3. An article of the character described, comprising a plurality of metal bars joined at their ends to provide a frame, each of said bars being h-shaped in cross section and having a central web disposed at right angles to the general plane of the frame, a flange projecting inwardly from one edge of said web and forming, in effect, an inwardly facing angle bar and a pair of flanges projecting outwardly from the edges of said web in the opposite direction from said first flange and forming, in effect, an outwardly facing channel, and a piece of relatively heavy gage wire cloth the strands of which are arranged in a common plane and set into said frame and having their ends welded at one side to the inner faces of said inwardly extending flanges.

4. An article of the character described, comprising a plurality of metal bars of generally h-shaped form in cross section, the ends of said bars being mitered and butt welded together to form a frame, said bars each comprising a central web disposed at right angles to the general plane of the frame, a flange projecting inwardly from one edge of said web and forming, in effect, an inwardly facing angle bar and a pair of flanges projecting outwardly from the edges of said web in the opposite direction from said first flange and forming, in effect, an outwardly facing channel and a piece of relatively heavy gage wire cloth the strands of which are arranged in a common plane and set into said frame and having their ends welded at one side to the inner faces of said inwardly extending flanges.

CHARLES A. SCHEELER.